(12) United States Patent
Nozu (10) Patent No.: US 6,446,140 B1
(45) Date of Patent: Sep. 3, 2002

(54) DATA INPUT/OUTPUT DEVICE, DATA INPUT/OUTPUT METHOD AND STORAGE MEDIUM

(75) Inventor: Takashi Nozu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/435,359

(22) Filed: Nov. 8, 1999

(30) Foreign Application Priority Data

Nov. 10, 1998 (JP) .......................................... 10-333354

(51) Int. Cl.[7] .............................................. G06F 3/00
(52) U.S. Cl. ............................. 710/1; 710/13; 710/23; 710/55; 711/145; 711/171
(58) Field of Search ............................. 710/1, 2, 9, 12, 710/13, 22, 23, 55, 101; 711/1, 145, 171, 173

(56) References Cited

U.S. PATENT DOCUMENTS

| | | | | |
|---|---|---|---|---|
| 5,480,236 A | * | 1/1996 | Kawaoka | 400/120.01 |
| 5,677,900 A | * | 10/1997 | Nishida et al. | 369/48 |
| 5,809,558 A | * | 9/1998 | Matthews et al. | 711/173 |
| 5,907,854 A | * | 5/1999 | Kerns | 711/103 |
| 6,003,045 A | * | 12/1999 | Freitas et al. | 707/205 |
| 6,021,415 A | * | 2/2000 | Cannon et al. | 707/206 |
| 6,229,909 B1 | * | 5/2001 | Tohyama | 382/124 |

FOREIGN PATENT DOCUMENTS

JP 4-52923 2/1992

OTHER PUBLICATIONS

Japanese Patent Publication No. Hei 10–114,279, (10/99), pp 1–7.

* cited by examiner

*Primary Examiner*—Jeffrey Gaffin
*Assistant Examiner*—Rijue Mai
(74) *Attorney, Agent, or Firm*—Foley & Lardner (57) ABSTRACT

A file control part 1 newly opens a file A in a file storage part 11 through a file accessing part 2, and secures a file data area having a certain size. An input/output control part 4 issues a request of writing into the file A to the file control part 1, and then writes data supplied from an input/output device 7 directly to a proper position of the data portion of the file A stored in a storage part 6 on the basis of information about the file A from the file control part 1. When the size of data to be written exceeds the file size previously secured, an input/output file managing part 8 requests again the file control part 1 to supplement a file data area having a certain size and makes it supplement the file data area.

8 Claims, 5 Drawing Sheets

DATA INPUT/OUTPUT DEVICE, DATA INPUT/OUTPUT METHOD AND STORAGE MEDIUM

CROSS REFERENCE TO RELATED APPLICATIONS

The present invention claims priority from Japanese Patent Application No. 10-333354 filed Nov. 10, 1998, the contents of which are incorporated herein by reference.

BACKGROUND OF THE INVENTION

1. Field of the Invention

The present invention relates to a data input/output device, a data input/output method and a storage medium, and particularly to a data input/output device, a data input/output method and a storage medium which are preferably used for a copying machine, a printer, a facsimile and the like, and capable of inputting and storing a file being not definite in data size.

2. Description of Related Art

An example of conventional data input/output systems is described in Japanese Patent Publication No.Hei 4-52,923. This conventional data input/output system is composed of an input/output control part, a buffer memory, a controller, a file storage part, a memory control part and a data compression part.

A conventional data input/output system having such a composition operates in the following manner. That is to say, the system takes out file data from a file storage part and puts it into a buffer memory. At this time the data compression part performs a data compression and the like by means of conversion of the data. The input/output control part reads out file data from the buffer memory on the basis of file management information of the file storage part and writes the file data in order into an auxiliary storage.

And an example of conventional file systems each having a high-speed input/output function is described in Japanese Patent Publication No.Hei 10-114,279. This conventional file system having a high-speed input/output function is composed of a file control part, a file managing part, an input/output control part, a file storage part and an external input/output device.

A conventional file system having such a high-speed input/output function operates in the following manner. That is to say, in case of writing data from an input/output device into a file storage part, an input/output control part analyzes and writes file information of a file generated in advance into the data area of the file.

For example, in case of a copying machine, since its output (print out) method is determined in advance, the machine determines in advance a storage area to have copy data written and determines in advance an engagement of writing scanned data directly into the storage area. And when data is written into that storage area, the machine automatically prints out the data. By doing this it is possible to speed up a copying operation.

However, these prior arts have the following problems. The first problem is that in case of writing data in a file generated in a file storage part from an input/output device and the like, the data can be written only up to the file capacity of an already generated file. The reason is that a file control part cannot change the size of a file according to the size of data to be written when writing the data from an input/output device and the like into a file storage part.

The second problem is that in case of writing data in a file generated in a file storage part from an input/output device and the like, the size of data to be written must be definite. The reason is that in case of writing data from an input/output device into a file storage part, the file control part cannot compress the data to be written or change the size of a file.

SUMMARY OF THE INVENTION

In consideration of such circumstances, the present invention has been performed and makes it possible to write file data having an optional size.

According to the first aspect of the present invention, it provides a data input/output device having a function which makes a controller for performing input/output control store file data directly into a storage part for storing file data, wherein in order to write file data into the storage part the controller is provided with an area securing means for securing an area having a specified size in the storage part, a detecting means for detecting the starting address of an area of the storage part secured by the area securing means and a writing means for writing file data from the starting address detected by the detecting means, and when the size of file data is larger than the size of the area the area securing means secures the next area for writing the rest of the file data and the detecting means detects the starting address of the next area, and the writing means writes the rest of the file data from the starting address of the next area.

The area securing means can secure areas one cluster portion by one cluster portion. The writing means can write file data into areas one cluster portion by one cluster portion. The invention further comprises a comparing means for comparing the size of file data to be written into the storage part by the writing means and the size of an area secured in the storage part by the area securing means with each other, and the area securing means can secure the next area in the storage part according to a result of comparison by the comparing means. It is possible that the storage part is composed of a first portion for storing file data and a second portion for storing attribute information of file data, the detecting means detects the starting address of file data from the attribute information stored in the second portion, and the writing means writes file data from the starting address into the first portion. It is possible that a reading means for reading specified file data stored in the storage part is further provided, the detecting means detects the starting address of an area where the file data to be read by the reading means is stored and, when the file data is stored in a plurality of areas, detects in order the starting addresses of the subsequent areas to that area, and the reading means reads the file data from the starting address detected by the detecting means.

According to the second aspect of the present invention, it provides a data input/output method in a data input/output device having a function which makes a controller for performing input/output control store file data directly into a storage part for storing file data, wherein in order to write file data into the storage part the controller is provided with an area securing step of securing an area having a specified size in the storage part, a detecting step of detecting the starting address of an area of the storage part secured by the area securing step and a writing step of writing file data from the starting address detected by the detecting step, and when the size of file data is larger than the size of an area the area securing step secures the next area for writing the rest of the file data and the detecting step detects the starting address of the next area, and the writing step writes the rest of the file data from the starting address of the next area.

The scope of claims of the present invention includes a storage medium for storing a program capable of performing such a data input/output method.

In a data input/output device, a data input/output method and a storage medium according to the present invention, in order to write file data into the storage part, an area having a specified size is secured in a storage part, the starting address of the area secured in the storage part is detected, and the file data is written from the detected starting address. And when the size of file data is larger than the size of a secured area, the next area for writing the rest of the file data is secured and the starting address of the next area is detected, and the rest of the file data is written from the starting address of the detected next area.

BRIEF DESCRIPTION OF THE DRAWINGS

Next, embodiments of the present invention are described with reference to the accompanying drawings.

FIG. 1 is a block diagram showing a composition example of an embodiment of a file system which a data input/output device of the present invention is applied to.

FIG. 4 is a block diagram showing a composition example of another embodiment of a file system which a data input/output device of the present invention is applied to.

DETAILED DESCRIPTION OF THE PREFERRED EMBODIMENTS

Figure 1:
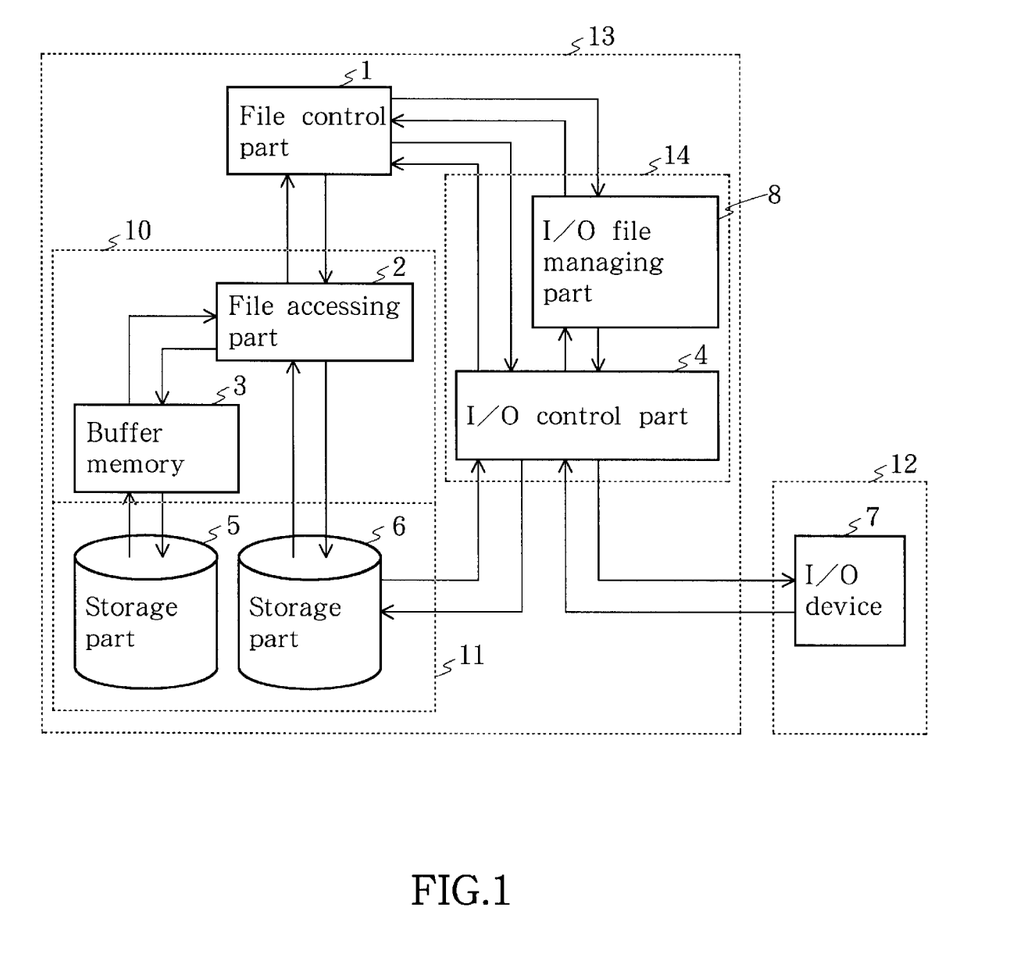

FIG. 1 is a block diagram showing a composition example of an embodiment of a file system which a data input/output device of the present invention is applied to. An outline of the present invention is described with reference to FIG. 1 in the following. A file control part 1 forming this embodiment manages files and the like stored in storage parts 5 and 6 forming a file storage part 11, and notifies an input/output control part 4 and an input/output file managing part 8 of file information and the like stored in the storage parts 5 and 6.

For example, in case of generating a new file A in the storage part 5 or 6 and writing file data into it from the input/output control part 4, the file control part 1 controls a file accessing part 2 to open newly the file A in the file storage part 11, and at the same time, secures temporarily a file data area having a certain size.

When receiving a request from the file control part 1, the file accessing part 2 performs access to the storage part 6 storing file data and the like and a buffer memory 3 of the storage part 5 storing file attribute information and the like.

The buffer memory 3 is a memory to be used as a buffer of the storage part 5 storing file attribute information and the like, the storage part 5 stores mainly file attribute information and the like, and the storage part 6 stores mainly file data and the like.

The input/output control part 4 issues a request for writing data into a file A to the file controller 1 and then writes data supplied from an input/output device 7 directly to a proper position of the data portion of the file A stored in the storage part 6 on the basis of notification of file information of the file A received from the file control part 1.

When the size of data to be written exceeds a file size temporarily secured, the input/output file managing part 8 requests again the file control part 1 to temporarily supplement a file data area having a certain size. When receiving this request, the file control part 1 controls again the file accessing part 2 to supplement a file data area.

When the input/output control part 4 finishes writing data into the file A, it notifies the file control part 1 of this fact. The file control part 1 which has received this notification controls the file accessing part 2 to close the file A and ends a file writing operation.

Figure 2:
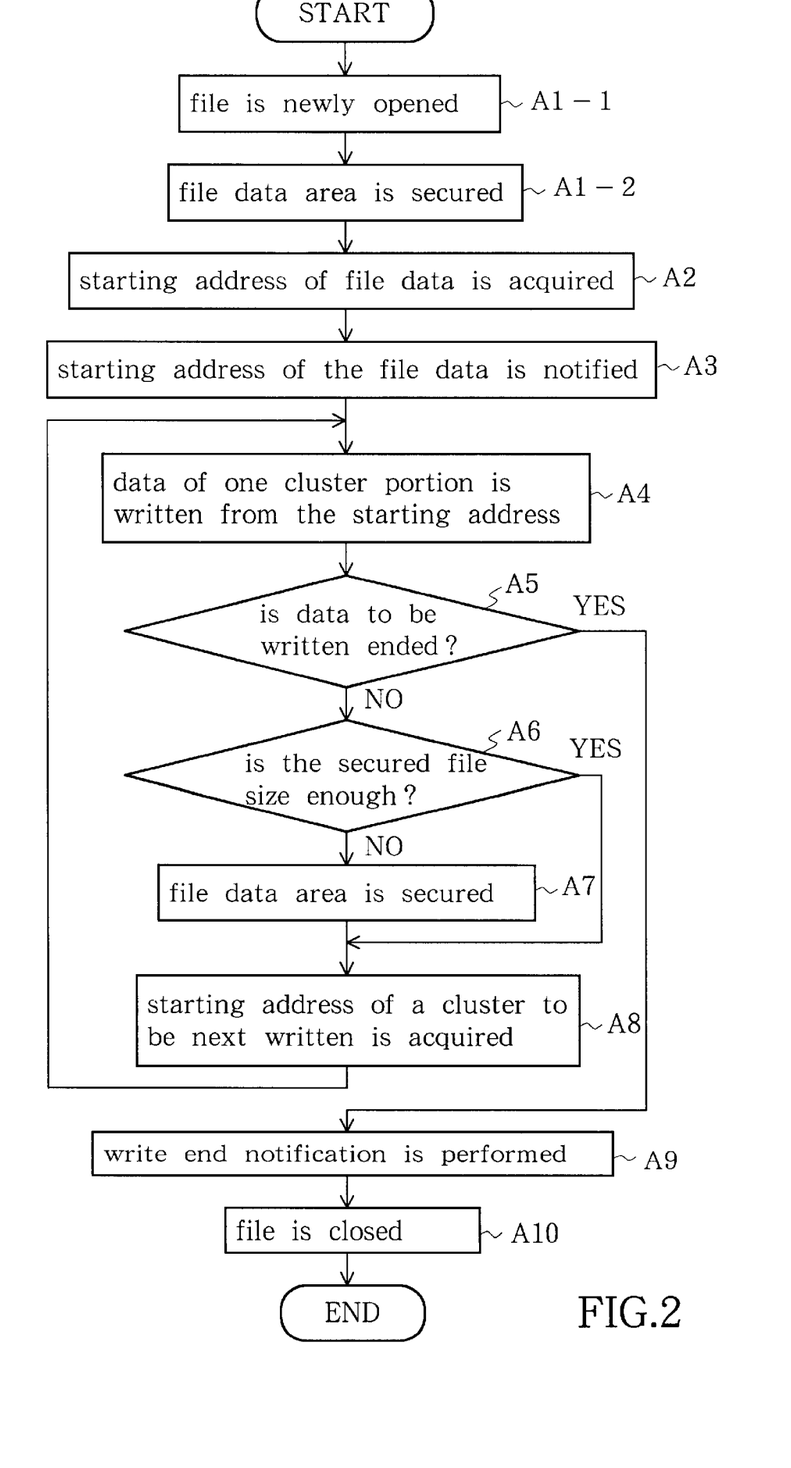
FIG. 2 is a flowchart for explaining operation of the file system of FIG. 1.

Next, referring to FIGS. 1 and 2, a composition example of an embodiment of a file system to which a data input/output device of the present invention is applied and its operation are described in detail.

As shown in FIG. 1, this embodiment comprises a file system part 13 for controlling and managing files and such an external input/output device 12 for inputting/outputting data from the outside as a scanner, a printer or the like.

And the file system part 13 is provided with a file control part 1, a file managing part 10 actually accessing a file, an input/output managing part 14 for writing and reading data from an input/output device 7 to a specified file of the storage part 6 and managing the size of data, and a file storage part 11 composed of a memory, a magnetic disk and the like.

The file managing part 10 is provided with a file accessing part 2 and a buffer memory 3. The file storage part 11 is provided with storage parts 5 and 6.

The input/output managing part 14 is provided with an input/output control part 4 capable of setting a bus of input/output data and capable of writing and reading data to a specified file of the storage 6, and an input/output file managing part 8 for performing a data size management in case that the input/output device 7 reads or writes data to the storage part 6.

The file control part 1 can not only perform such ordinary file control as a file opening process and a file closing process but also acquire file information of a file stored in the storage parts 5 and 6, for example, the starting address of an area where file data stored by controlling the file managing part 10. And it can notify the input/output control part 4 of the acquired file information of a file.

The file accessing part 2 can access a file stored in the storage parts 5 and 6, and can read and write the file. Moreover, it can do with performing as little as possible access to the storage part 5 taking a long time by storing in advance information necessary for file management, for example, file allocation table (FAT) information and the like in the buffer memory 3.

The input/output control part 4 determines whether data is an input from the input/output device 7 or an output to the input/output device 7, and reads or writes the file data to the storage parts 5 and 6. At the time of this reading or writing, the input/output control part 4 can perform a write or read operation to the starting address of a specified file of the storage part 6.

The input/output file managing part 8 performs management of file data to be inputted/outputted. That is to say, in case of generating newly a file, the input/output file managing part 8 issues a request for temporarily securing a file data area having a certain size to the file control part 1. And in case that the size of file data to be outputted seems to exceed a file size temporarily secured, it requests again the file control part 1 to temporarily supplement a file data area having a certain size.

Next, referring a flowchart of FIG. 2, operation of the embodiment of FIG. 1 is described.

For example, in case that the input/output control part 4 has issued a request for writing file data into a new file A which has not yet been generated in the storage parts 5 and 6 to the file control part 1, the file control part 1 first controls the file accessing part 2 and requests the file storage part 11 to newly open a file A and temporarily secure a file data area having a certain size.

The file accessing part 2 controls the storage part 6 storing file data and the like and the buffer memory 3 of the storage part 5 storing FAT information and the like to perform a file opening process for opening the file A (step A1-1).

At the same time it secures temporarily a file data area having a certain size for the file A (step A1-2). Furthermore, it acquires file information about the file A (step A2).

The file information in this case includes the starting address of a file data area of the storage part 6 where file data of the file A is actually stored, a cluster list known from FAT data representing relation between the respective clusters for the file data area of the file A, and the like.

When the file accessing part 2 has acquired information abut the file A, then it notifies the file control part 1 of this information about the file A (step A3). And the file control part 1 notifies the input/output control part 4 of the information about the file A notified by the file accessing part 2.

The input/output control part 4 notified of the information about the file A by the file control part 1 writes data from the input/output device 7 directly to a proper position of the file data portion of the file A stored in the storage part 6 on the basis of this information (step A4). Concretely, it writes one cluster portion out of the data from the input/output device 7 directly at the starting address of a file data area where the file data portion of the file A is stored.

And at this time, it is judged whether or not a write operation of file data to be written into a data area of one cluster portion at the head of the file data area of the file A is finished (step A5), and in case that it has been judged that a write operation of file data to be written is not finished (No in step A5), the starting address of a cluster to be next written is acquired from the notified information about the file A (step A8) and subsequently data from the input/output device 7 is written to this starting address of the storage 6 (step A4).

Hereupon, in case that it has been judged that a write operation of file data to be written has not been ended (No in step A5), it is judged in the input/output file managing part 8 whether or not the size of data to be written exceeds a temporarily secured file size (step A6), and in case that it has been judged that the size of data to be written does not exceed the temporarily secured file size (Yes in step A6), as described above, the starting address of a cluster to be next written is acquired (step A8), and further subsequently data from the input/output device 7 is written to this starting address in the storage part 6 (step A4).

On the other hand, in case that it has been judged that the size of data to be written exceeds a temporarily secured file size (No in step A6), the input/output file managing part 8 requests again the file control part 1 to temporarily supplement a file data area having a certain size. The file control part 1 which has received this request controls again the file accessing part 2 to supplement a file data area (step A7).

In case that it has been judged that a write operation of file data to be written, said file data being supplied from the input/output device 7, to the storage part 6 is completely finished (Yes in step A5), the input/output control part 4 notifies the file control part 1 of this fact (step A9). At the same time, it notifies it also of the data length of the written file data.

The file control part 1 which has received this notification computes a file size from the data length of the file data written into the storage part 6, controls a file pointer to set termination so that the file A does not cause a problem in management of the file system, and controls the file accessing part 2 to close the file (step A10). After this, the process is ended.

Figure 3:
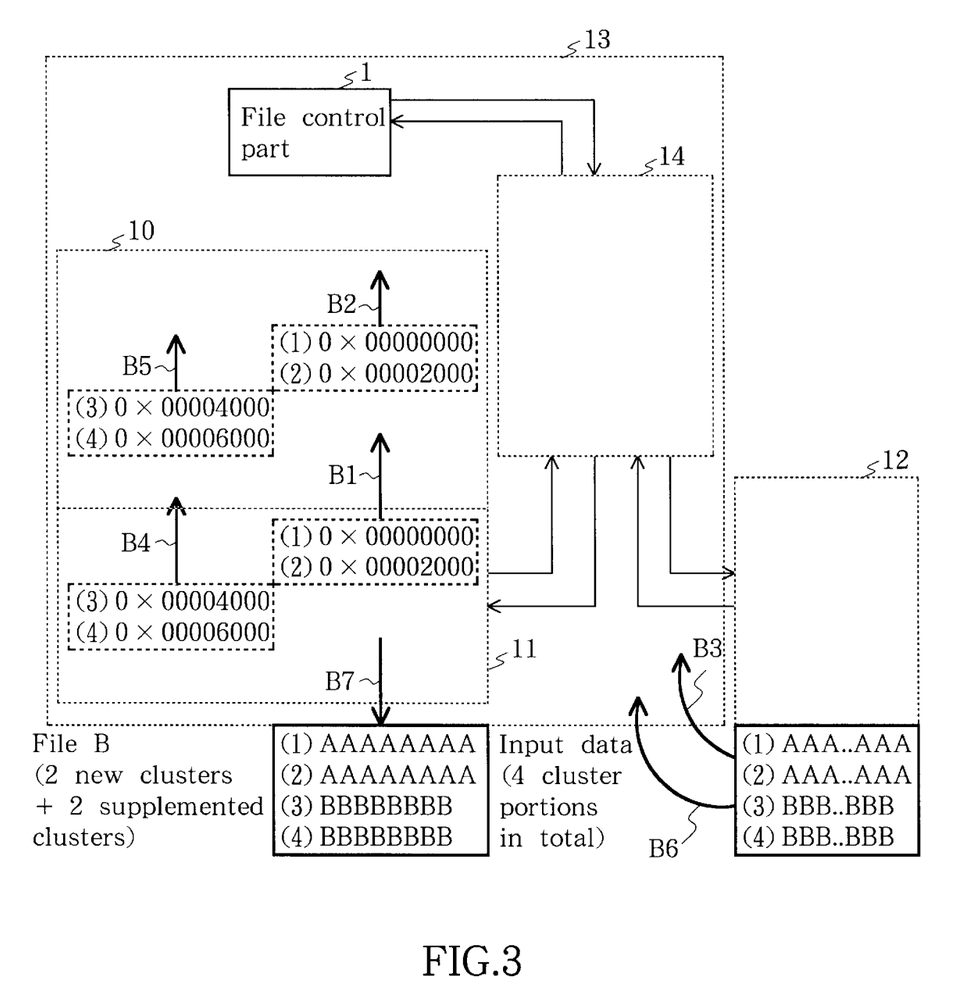
FIG. 3 is a schematic diagram showing a concrete example of the operation shown in FIG. 2.

Next, a concrete example is described. As shown in FIG. 3, it is assumed that the input/output control part 4 has issued a write request for writing file data into a file B not yet generated in the storage parts 5 and 6 to the file control part 1.

At this time first, the file control part 1 controls first the file managing part 10 and the file storage part 11 to open the file B and temporarily secures, for example, a file data area of two cluster portions for the file B (B1). At the same time, the file control part 1 acquires a cluster list related to the file B from the file managing part 10 and notifies the input/output control part 4 of information about the file B notified by the file managing part 10 (B2).

The input/output control part 4 notified of the information about the file B writes data AAA . . . AAA from the input/output device 7 directly to the starting address 0×00000000 (where 0× shows that 00000000 is a hexadecimal number) of a data area storing the file data portion of the file B stored in the storage part 6 on the basis of the notified information, namely, the cluster list information.

Moreover, since there are plural clusters of file data to be written, the input/output control part 4 detects the starting address 0×00002000 of the next cluster from the notified information about the file B, and further subsequently it writes data AAA . . . AAA from the input/output device 7 to the starting address 0×00002000 in the storage part 6 (B3).

Hereupon, when in the input/output file managing part 8 managing files it is judged that the size of data to be written exceeds the size of two clusters which is a temporarily secured file size, the input/output file managing part 8 requests again the file control part 1 to temporarily supplement a file data area having a certain size, namely, a file data area of two cluster portions, and sets the size of the file B at four clusters (B4).

Again, the input/output control part 4 notified of the supplemented information about the file B writes data BBB . . . BBB and data BBB . . . BBB from the input/output device 7, respectively, directly to the starting addresses 0×00004000 and 0×00006000 of the data areas storing the file data portions of the file B stored in the storage part 6 on the basis of the supplemented cluster list information (B5) about the file B (B6).

When a write operation of file data to be written into the storage part 6 which file data is supplied from the input/output device 7 is finished, the input/output control part 4 notifies the file control part 1 of this fact. At the same time it notifies it also of the data length of the written file data.

The file control part 1 which has received this notification computes a file size from the data length of the written file data, controls a file pointer to set termination so that the file B does not cause a problem in management of the file system, and controls the file accessing part 2 to close the file (step B7).

As described above, the following effect; can be obtained by using the above-mentioned embodiment.

The first effect is that in a device having a function of storing file data directly in a storage part from an I/O control part, for example, a copying machine, a printer, a facsimile and the like, even in case that the size of file data to be written from an external input/output device is not definite, it is possible to write the data from the external input/output device into a file in the storage part. As a result, restrictions with respect to the size of file data to be written from an external device is removed and any large file data can be written up to the capacity of the storage part.

The reason is that the input/output managing part monitors the size of file data to be written from an external input/output device, and supplements again a file size secured in the storage part when the size of the file data seems to exceed the size of a file secured in the storage part.

Figure 4:
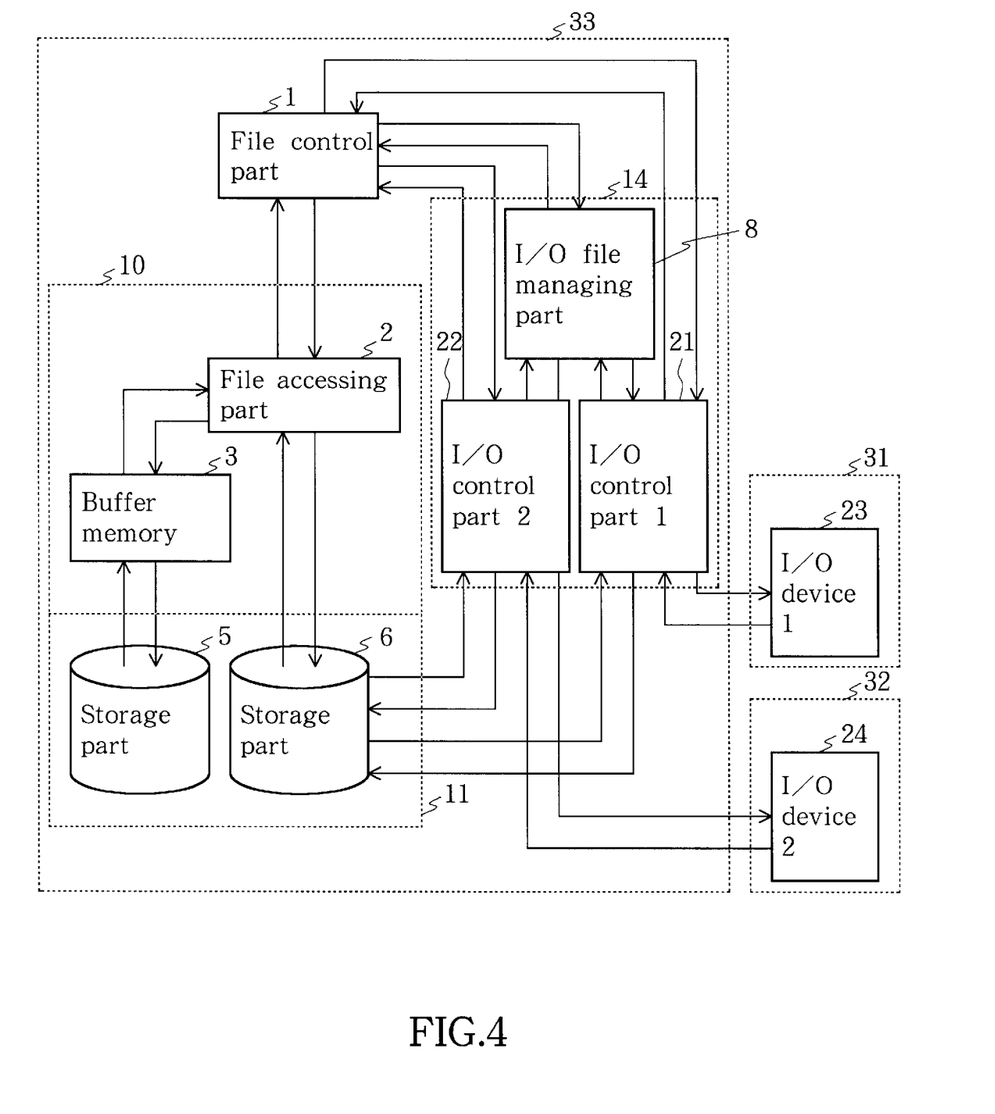

FIG. 4 is a block diagram showing a composition example of another embodiment of a file system which a data input/output device of the present invention is applied to. As shown in FIG. 4, this embodiment is different from the embodiment shown in FIG. 1 in that a file system 33 comprises a first input/output control part 21 and a second input/output control part 22, and has a first input/output device 23 and a second input/output device 24.

The first input/output control part 21 determines whether data is input data from the first input/output device 23 or output data to the first input/output device 23, and reads or writes the data to storage parts 5 and 6. At the time of this reading or writing, it can read or write the data to the starting address of a specified file of the storage part 6.

In the same way, the second input/output control part 22 determines whether data is input data from the second input/output device 24 or output data to the second input/output device 24, and reads or writes the data to the storage parts 5 and 6. At the time of this reading or writing, it can read or write the data to the starting address of a specified file of the storage part 6.

Figure 5:
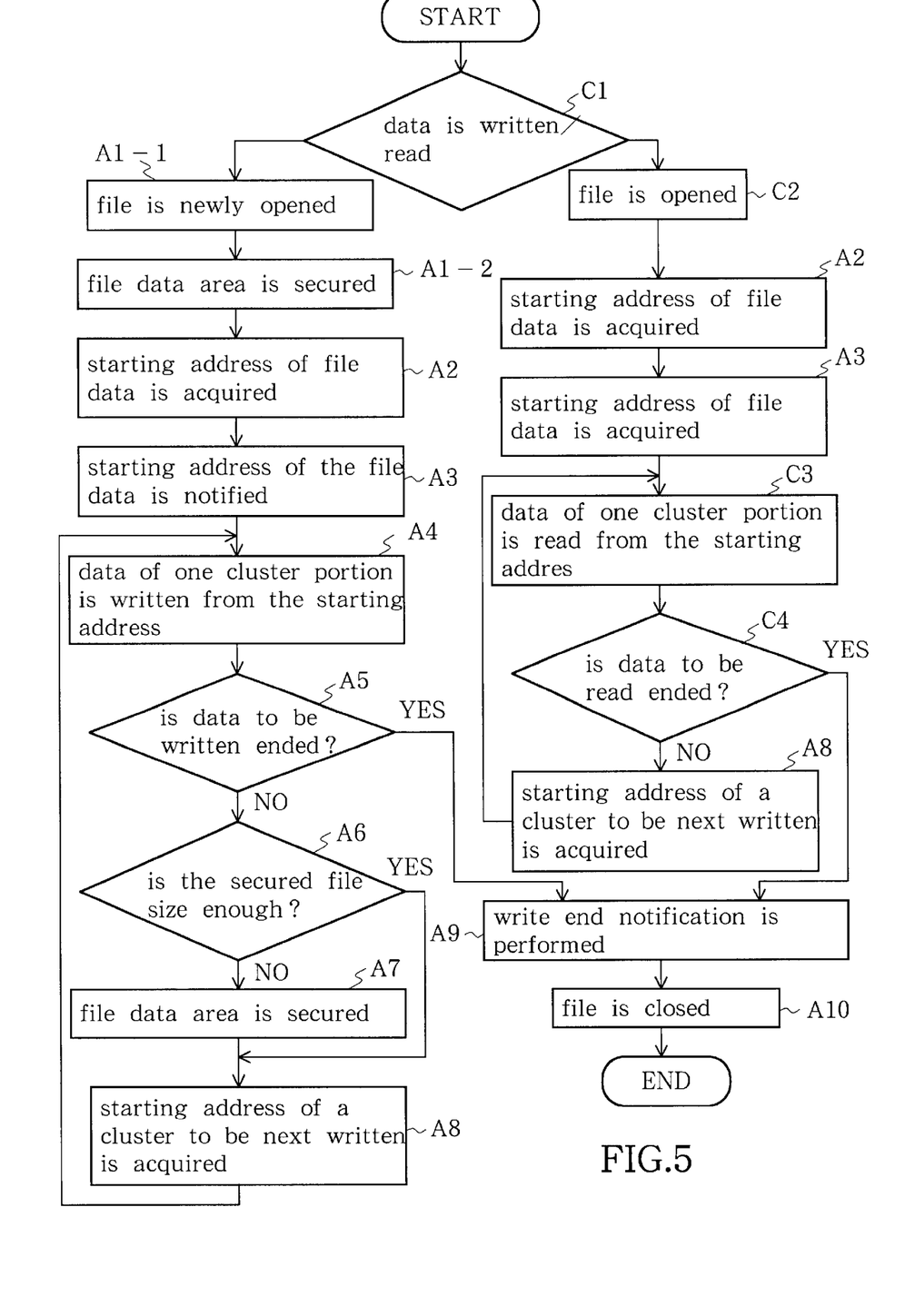
FIG. 5 is a flowchart for explaining operation of the file system of FIG. 4.

Next, operation of this embodiment is described with reference to a flowchart of FIG. 5. Since operation of this embodiment shown in steps A1 to A10 of the flowchart of FIG. 5 is the same operation in case of the embodiment shown in FIG. 1, description of them is properly omitted here.

The embodiment shown in FIG. 1 has only one input/output device 7, but this embodiment has the first input/output device 23 and the first input/output control part 21 connected to it, and has the second input/output device 24 and the second input/output control part 22 connected to it, and thereby makes possible read and write operations of files to the two input/output devices at the same time.

First, it is judged whether a request is a data write request or a data read request (step C1). In case that the request has been judged as a data write request, processes on and after step A1-1 are performed, but since the operation at this time is the same as that of the embodiment shown in FIG. 1, description of it is omitted.

On the other hand, in case that the request has been judged as a data read request, namely, in case that a request for reading file data from a file A already generated in the storage parts 5 and 6 to the input/output control part 21 has been issued to the file control part 1, the file control part 1 controls first the file accessing part 2 to open the file A (step C2).

The file accessing part 2 controls the storage part 6 storing file data and the like and the buffer memory 3 of the storage part 5 storing file attribute information, FAT information and the like to perform a file opening process of the file A and acquire file information about the file A (step A2).

The file information in this case includes the starting address of a data area in the storage part 6 where file data of the file A is actually stored, a cluster list known from FAT data representing relation between the respective clusters for the file data area of the file A, and the like. When the file accessing part 2 acquires information about the file A, it notifies the file control part 1 of this information.

The file control part 1 notifies the input/output control part 21 of the information about the file A notified by the file accessing part 2 (step A3).

The input/output control part 21 notified of the information about the file A reads, for example, data of one cluster portion directly from a proper position of the file data portion of the file A stored in the storage part 6 on the basis of that information and supplies the read data to the input/output device 23 (step C3). Concretely, it reads data directly from the starting address of the file data portion of the file A and writes the read data directly into the input/output device 23.

And at this time it is judged whether or not all data to be read in have finished being read in (step C4), and in case that all data to be read have not yet finished being read in, namely, in case that file data larger than the data area of one cluster portion of the head of the file data area of the file A is read in (No in step C4), the input/output control part 21 detects the starting address of a cluster to be next read in from the notified information about the file A (step A8), further successively it reads and supplies data from this starting address in the storage part 6 to the input/output device 23 (step C3).

When reading file data from the storage part 6 to be supplied to the input/output device 23 is finished, the input/output control part 21 notifies the file control part 1 of this fact. The file control part 1 which has received this notification controls the file accessing part 2 to close the file A.

The file control part 1 controls the first input/output device 23 and the second input/output device 24 in the same way as that in which the file control part 1 in the embodiment shown in FIG. 1 controls the input/output control part 4. In this case, a state where there is no problem as a file system is kept. That is to say, a special state as a file system is not permitted by providing the two input/output control parts 21 and 22, but the system operates always in the same state as the embodiment shown in FIG. 1. In other words, it does not influence a state of operation of the system that the system has the two input/output control parts 21 and 22.

As described above, thanks to having two pairs of input/output control parts 21 and 22 and input/output devices 23 and 24, this embodiment makes it possible, for example, for the input/output device 24 to read and write data to a file of the storage part 6 even when the input/output device 23 is generating input data. Therefore, the input data portions which are finished being written into the storage part 6 from the input/output device 23 out of input data being under generation can be read out in order as output data from the storage part 6 to the other input/output device 24.

And since this embodiment permits the plural input/output devices 23 and 24 to perform write and read operations at the same time to one file stored in the storage part 6, as described above with reference to FIG. 1, there is no restriction with respect to the file size of file data to be written from external input/output devices 31 and 32, and not only any large file data can be written up to the capacity of the storage part 6, but also it is possible to write data, for example, from the input/output device 32 into a file in the storage part 6 at the same time as when the input/output device 31 is generating data to be written. Since a data input starting process from an external input/output device 31 or 32 is made fast thanks to this, this embodiment has also a new effect of enabling speedup of a process.

In this embodiment, in case that the file size of a file data area to be first secured temporarily or the file size of file data to be written exceeds the file size of a file data area temporarily secured, it is possible to enlarge the file size of a file data area to be supplemented.

And although the above-mentioned embodiment sets the data size in case of securing a file data area as the size of two cluster portions and sets the data size of file data to be written or read as the size of one cluster portion, the present invention is not limited to this.

As described above, according to a data input/output device, a data input/output method and a storage medium of the present invention, in order to write file data into a storage part, an area having a specified size is secured in the storage part, the starting address of the secured area of the storage part is detected, and the file data is written from the detected starting address. And when the size of file data is larger than the size of a secured area, the next area for writing the rest of the file data is secured and the starting address of the next area is detected, and the rest of the file data is written from the starting address of the next area, and therefore it is possible to write file data having an optional size into a data input/output device in which a controller for performing input/output control has a function of storing file data directly into a storage part for storing file data.

What is claimed is:

1. A data input/output device in which a controller for performing input/output control has a function of storing file data directly into a storage part for storing file data, wherein;

said controller comprises;

an area securing means for securing an area having a specified size in said storage part in order to write said file data into said storage part, a detecting means for detecting the starting address of said area of said storage part secured by said area securing means, and a writing means for writing said file data fromsaid starting address detected by said detecting means; and when the size of said file data is larger than the size of said area, said area securing means secures the next area for writing the rest of said file data, said detecting means detects the starting address of said next area, and said writing means writes the rest of said file data from the starting address of said next area.

2. A data input/output device according to claim 1, wherein;

said area securing means secures areas one cluster portion by one cluster portion.

3. A data in put/output device according to claim 1, wherein;

said writing means writes said file data one cluster portion by one cluster portion into said areas.

4. A data input/output device according to claim 1, wherein;

said writing means further comprises a comparing means for comparing the size of file data to be written into said storage part and the size of an area secured by said area securing means in said storage part with each other, and said area securing means secures the next area in said storage part according to a result of comparison by said comparing means.

5. A data input/output device according to claim 1, wherein;

said storage part is composed of a first portion for storing said file data and a second portion for storing attribute information of said file data, said detecting means detects the starting address of said area from said attribute information stored in said second portion, and said writing means writes said file data from said starting addres into said first portion.

6. A data input/output device according to claim 1, further comprising a reading means for reading specified file data stored in said storage part, wherein;

said detecting means detects the starting address of an area where said file data to be written by said writing means is stored, and detects in order the starting address of the next area when said file data is stored in a plurality of areas, and said reading means reads said file data from said starting address detected by said detecting means.

7. A data input/output method in a data input/output device in which a controller for performing input/output control has a function of storing file data directly into a storage part for storing file data, wherein;

said controller comprises;

an area securing step for securing an area having a specified size in said storage part in order to write said file data into said storage part, a detecting step for detecting the starting address of said area of said storage part secured by said area securing step, and a writing step for writing said file data from said starting address detected by said detecting step; and when the size of said file data is larger than the size of said area, said area securing step secures the next area for writing the rest of said file data, said detecting step detects the starting address of said next area, and said writing step writes the rest of said file data from the starting address of said next area.

8. A storage medium in which a program of capable of performing a data input/output method according to claim 7 is stored.

\* \* \* \* \*